Oct. 23, 1962  P. D. FROST  3,059,769
EXTRUSION LUBRICATION
Filed April 14, 1959
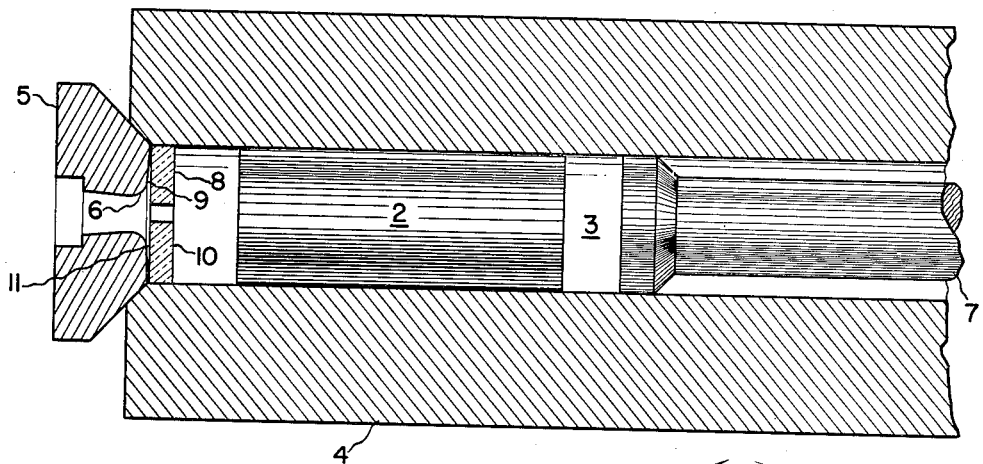
*Fig. 1*
*Fig. 2*
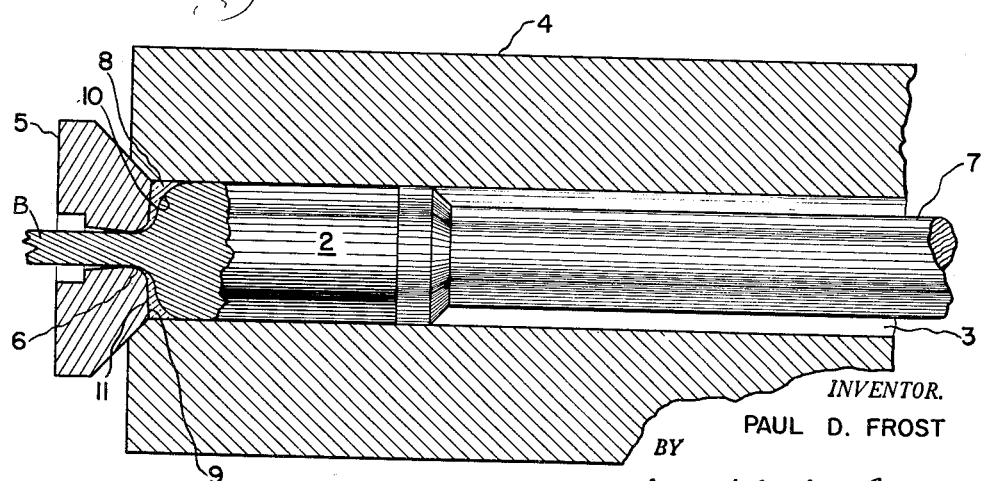
INVENTOR.
PAUL D. FROST
BY
*Wobley, Mackey & Burden*
ATTORNEY United States Patent Office 3,059,769
Patented Oct. 23, 1962

3,059,769
EXTRUSION LUBRICATION
Paul D. Frost, Columbus, Ohio, assignor, by mesne assignments, to Compagnie du Filage des Metaux et des Joints Curty
Filed Apr. 14, 1959, Ser. No. 806,274
10 Claims. (Cl. 207—10)

This invention relates to extrusion lubrication. More particularly, it relates to useful materials and methods for die lubrication in the extrusion of steel, titanium, their alloys and allied materials.

Extrusion of both steel and titanium alloys are at present fraught with many difficulties. It has been found extremely difficult in the past to ensure adequate lubrication during the hot extrusion of these metals. The high temperatures necessary for good steel extrusion have resulted in excessive die wear, so that both adequate lubrication of the die and cooling of the die are necessary. And the ease with which titanium galls when rubbed or extruded necessitates excellent lubrication for successful extrusion. Furthermore, in the range of temperatures at which such hot extrusion is conducted, even the known solid lubricants fail, for various reasons, to perform with entire satisfaction.

It is an object of this invention to provide an improved lubricant composition for hot extrusion of metals. Another object of the present invention is to provide a new and improved method of lubrication for hot extrusion.

A further object of the present invention is to provide a new and useful method of making a lubricant composition suitable for use in the hot extrusion of metals.

FIG. 1 is a partial longitudinal vertical section through the container of an extrusion press and also showing the die for extruding a solid bar; and FIG. 2 is a view similar to FIG. 1 illustrating the way in which a pad of glass inserted between the die and the workpiece operates to lubricate the die.

Referring more particularly to the accompanying drawings, a steel workpiece 2, such as an ingot or billet, is received in an extrusion chamber 3 formed by a container 4. A die 5 is located at one end of the extrusion chamber 3 and has a die opening 6 through which the bar is to be extruded by pressure applied to the workpiece 2 by a ram 7. Reference numeral 8 designates a pad of glass which is placed between the die 5 and the workpiece 2 and which rests against a ledge 9 surrounding the die opening 6. In carrying out an extrusion, the glass pad 8 is placed between the die 5 and the workpiece 2 so that the pad 8 surrounds the die opening 6. In the illustrated embodiment, the glass pad 8 is annular in form. The annular pad 8 should cover the major portion of the ledge 9. After placing the glass pad 8 in the extrusion chamber 3, the workpiece 2, heated to extrusion temperature, is introduced into the extrusion chamber 3 and pressure is applied to the ram 7 to force the workpiece 2 through the die opening 6.

The manner in which the glass pad 8 lubricates the die 5 is illustrated in FIG. 2. The workpiece 2 heated to, say, 1200° C., is in contact with the surface 10 of the glass pad 8, while the other surface 11 is in contact with the die 5 which may be at a temperature of, say, 300° C. as a result of a previous operation. Accordingly, there is a temperature gradient in the glass pad 8. As the extrusion operation proceeds, the surface 10 of the pad 8, which is in contact with the heated workpiece 2, melts and is ejected through the die opening 6 around the bar B. The film of glass which is in immediate contact with the workpiece 2 may be so fluid as to offer insufficient protection for the die, but, since there is a temperature gradient in the pad 8, the films of glass between the surface 10 and the surface 11 are of progressively less fluidity or, stated otherwise, the films of glass between the surface 10 and the surface 11 are of progressively greater viscosity. The applied pressure eliminates the films which are of insufficient viscosity to effectively protect the die, and an equilibrium is automatically established between the pressure required for ejection of the glass film and the resistance corresponding to the viscosity of the remaining films. Thus, at any given instant in the extrusion operation, a film which is too fluid to offer effective protection to the die is ejected, but there is available adjacent to this too-fluid film a film having a viscosity which is proper for flowing continuously through the die opening 6, around the bar B, and offering effective protection to the die. In carrying out the extrusion operation, the workpiece 2 is extruded at such rate that the surface 10 of the glass layer 8 which is adjacent the workpiece 2 melts continuously and, under the pressure employed, flows continuously through the die opening 6 around the article B being extruded, while the surface 11 of the glass layer 8, that in contact with the ledge 9, remains substantially solid. At the end of the extrusion operation, a portion of the glass pad 8 which is substantially solid remains in the extrusion chamber 3.

This extrusion method is disclosed essentially in Sejournet et al. Patent No. 2,538,917 granted January 23, 1951.

According to the present invention, the lubricant pad in the method described above consists essentially of a particulate solid lubricant material dispersed in a glass-like lubricating material which has a wide viscosity range at and is incombustible at the extrusion temperature and, therefore, has a wide melting range as contrasted with a true melting point. This combined lubricating action of the melted glass and the dispersed particulate solid lubricant has been found superior to glass alone. Even at the high temperatures of extrusion, the solid lubricant particles do not oxidize or become unstable due to the protection of the glass in which they are dispersed.

Laboratory studies and extrusion trials were conducted to evaluate mixtures of glass and solid lubricants for extrusion of steel and titanium alloys. Extrusion tests were conducted on plain carbon steel and on Ti–6Al–4V alloy. Mixtures comprising different powdered glasses and 1 to 90 volume percent of graphite, molybdenum disulfide, or boron nitride, were prepared for evaluation in extrusion of a plain carbon steel V shape at 1200° C. (2192° F.). The performance of the mixtures was determined by the change in dimensions caused by die wear of the inside root radius and root thickness of the V section using the window glass normally used for extruding steel as a reference. Compared with the window glass alone, window glass-solid lubricant mixtures containing up to about 90 percent graphite, up to about 40 percent molybdenum disulfide, or up to about 40 percent boron nitride were more effective in reducing die wear. In addition, other types of glass with which graphite or molybdenum disulfide were mixed showed performances better than, or at least equal to, that of window glass alone. In extrusion of titanium alloy rounds at 910° C., good results were obtained with glass-solid lubricants, the best results being obtained where graphite was used as the solid lubricant.

Generally, the best results were obtained with mixtures containing 10 percent or less of the solid lubricant. Thus, it appears that benefit is derived from the presence of the solid lubricant by its ability to improve the performance of the glass, perhaps more than as a lubricant for the metal. Solid lubricants may increase the apparent viscosity of the glass-solid mixture. Thus, a less viscous glass can be maintained as a lubricating film during the extrusion of the billet. Graphite flakes may also improve the thermal conductivity of the mixture and, thus, a deeper layer of glass may become heated. Another important possibility is that the presence of the solid lubricant particles intermixed with the glass at the start of extrusion allows for a better distribution of the glass and reduces the amount of unmelted, abrasive glass particles ejected through the die.

Additionally, graphite particles between the non-melted glass particles act as a lubricant in the movement of these particles against one another and prevent solid glass particles in contact with the die and die holder from scratching their surface. Moreover, they facilitate shaping of the glass disc against the die holder.

Although some improvement was obtained with all three solid lubricants investigated—graphite, molybdenum disulfide, and boron nitride—the mixtures containing graphite appear to be the best.

The amount of solid lubricant that could be contained in a glass mixture and protected from oxidation was evaluated by heating small compacts of glass-solid lubricant mixtures at 1700° F. (926° C.). It was found that up to 90 weight percent molybdenum disulfide could be incorporated in such a mixture and protected against oxidation. The maximum amounts of graphite and boron nitride were somewhat smaller because of their lower bulk densities.

The factors controlling the permissible solid lubricant-to-glass ratio were: (1) softening temperature and viscosity of the glass; (2) particle size of the glass and solid lubricant; and (3) bulk densities of the glass and solid lubricant. With low melting glasses, the solid lubricant particles tended to exfoliate more readily, whereas higher melting glasses suppressed exfoliation. For a given glass, the ability to cover and protect the solid lubricant decreased with increased viscosity. In using discs comprising a mixture of glass particles and solid lubricant particles, best results were obtained when the glass particles had grain sizes ranging between 50 and 200 mesh. The solid lubricant particles should be as fine as possible. Desirably, at least 50 percent of the solid lubricant particles are smaller than 200 mesh and preferably all of them are smaller than 325 mesh.

For the extrusion experiments, the glasses were milled to a grain size finer than 200-mesh. The solid lubricants used in making the experimental mixtures were as follows. Flake graphite was used as the graphite ingredient and had a particle size 100 percent smaller than 325-mesh. The molybdenum disulfide used had a particle size 98 percent smaller than 200-mesh and 70 percent smaller than 325-mesh. The boron nitride used was high purity (greater than 95 percent) boron nitride powder with a particle size 100 percent smaller than 325-mesh.

For the particulate solid lubricant materials of this invention, lamellar-type solid lubricants are preferred. Of these, solid lubricant materials selected from the group consisting of graphite, molybdenum disulfide, and boron nitride are preferred. It has been found that, depending upon the above factors, operable lubricant compositions of the present invention have a solid-lubricant content by volume of from about 1 percent to about 90 percent, the balance being glass.

The following are examples of glasses (composition in weight percent) which may be used in the present invention.

TABLE I

|  | No. 1 | No. 2 | No. 3 | No. 4 |
|---|---|---|---|---|
| $SiO_2$ | 71.45 | 33.6 | 50.0 | 52.5 |
| $Na_2O$ | 15.85 | 16.0 | 19.8 | 29.5 |
| $B_2O_3$ |  | 35.5 | 18.8 | 10.0 |
| CaO | 8.2 | 7.45 | 5.9 |  |
| $Al_2O_3$ | 0.53 | 1.65 | 5.5 | 8.0 |
| $Fe_2O_3$ |  | 0.08 |  |  |
| $ZrO_2$ |  |  | 4.9 |  |
| MgO | 3.3 | 4.75 |  |  |
| $SO_3$ |  | 0.60 |  |  |

Glass No. 1 of Table I is typical of the "window glass" compositions normally used for extruding steels.

Following are examples of the present invention:

*Example 1*

A billet of plain carbon steel was extruded through a V-shaped die having an inside root radius of 1.7 mm. (0.068 inch) and a root thickness of 7 mm. (0.267 inch). The annular lubricant pad used during extrusion had the dimensions 60 mm. O.D. x 10 mm. I.D. x 8 mm. thick. The lubricant material used for the pad was "window glass" typical of the compositions normally used for extruding steels, the glass composition being that of glass No. 1 of Table I. To make the pad, the glass was milled 100 percent finer than 200-mesh and agglomerated with sodium silicate to form the pad. About 3 percent of sodium silicate was used. Prior to extrusion, the billet was heated in a $BaCl_2$ salt bath at 1200° C. (2192° F.). No glass was applied to the billet, since the residual salt on the billet from heating provided sufficient protection and lubrication. The container, however, was lightly swabbed with a grease-$MoS_2$ mixture before the extrusion. The die and dummy block were made of hot-work tool steel, hardened to 45–50 Rockwell C scale, and were not preheated.

Conditions for the extrusion were as follows:

Billet size: 60 mm. (2.36 inch) diameter x 140 mm. (5½ inch) long
Extrusion ratio: 41.55:1
Extrusion temperature: 1200° C. (2192° F.)
Container temperature: 320° C. (608° F.)
Ram speed: 148–164 mm./sec. (350–390 i.p.m.).

Efficiency of the lubricant was measured by measuring die wear. Die wear during the extrusion of this billet was measured by measuring the increase in the inside root radius and in the root thickness of the V-shaped die. The inside root radius (R) increased by 2.1 mm. and the root thickness (e) increased by 1.0 mm. during the extrusion.

*Example 2*

Same conditions and materials as Example 1, except for the composition of the lubricant pad. For this extrusion, the lubricant pad consisted of a mixture of 95 percent (by volume) of glass No. 1 of Table I (sized 100 percent finer than 200-mesh) and 5 percent (by volume) of graphite (sized 100 percent finer than 325-mesh), the agglomeration being with sodium silicate as a binder. R increased by 1.3 mm. and e increased by 0.6 mm.

*Example 3*

Same conditions and materials as Example 2, except that 10 percent graphite was used in the lubricant pad instead of 5 percent. R increased by 1.2 mm. and e increased by 0.5 mm.

*Example 4*

Same conditions and materials as Example 2, except that 40 percent graphite was used in the lubricant pad, and a phenol-formaldehyde thermosetting resin (Bakelite Varnish 1600) was used as a binder instead of sodium silicate. R increased by 1.8 mm. and e increased by 0.4 mm.

Example 5

Same conditions and materials as Example 2, except that 1 percent graphite was used in the lubricant pad. R increased by 1.6 mm. and e increased by 0.7 mm.

Example 6

Same conditions and materials as Example 4, except that 90 percent graphite was used in the lubricant pad. R increased by 1.9 mm. and e increased by 0.7 mm.

Example 7

Same conditions and materials as Example 2, except that molybdenum disulfide (sized 98 percent smaller than 200-mesh and 70 percent smaller than 325-mesh) was used in place of graphite. R increased by 1.4 mm. and e increased by 0.6 mm.

Example 8

Same conditions and materials as Example 3, except that boron nitride (sized 100 percent smaller than 325-mesh) was used in place of graphite. R increased by 1.5 mm. and e increased by 0.6 mm.

Example 9

Same conditions and materials as Example 8, except that 40 percent boron nitride was used instead of 10 percent. R increased by 1.6 mm. and e increased by 0.6 mm.

Example 10

Same conditions and materials as Example 1, except for the composition of the lubricant pad. For this extrusion, the lubricant pad consisted of a mixture of 90 percent (by volume) of glass No. 4 of Table I (sized 100 percent smaller than 200-mesh) and 10 percent (by volume) of graphite (sized 100 percent smaller than 325-mesh) the agglomeration being with sodium silicate as a binder. R increased by 1.4 mm. and e increased by 0.5 mm.

Example 11

Same conditions and materials as Example 1, except for the composition of the lubricant pad. For this extrusion, the lubricant pad consisted of a mixture of 95 percent (by volume) of glass No. 3 of Table I (sized 100 percent smaller than 200-mesh) and 5 percent (by volume) of molybdenum disulfide (sized 98 percent smaller than 200-mesh and 70 percent smaller than 325-mesh), the agglomeration being with sodium silicate as a binder. R increased by 1.7 mm. and e increased by 0.7 mm.

Example 12

A billet of titanium alloy (Ti–6Al–4V) was extruded into a round bar 12.5 mm. (0.492 inch) in diameter through a flat-faced die with a radiused entry. The annular lubricant pad used during extrusion had the dimensions 60 mm. O.D. x 10 mm. I.D. x 8 mm. thick. The lubricant material used for the pad was glass No. 2 of Table I. To make the pad, the glass was milled (Tyler sieve analysis was 80 weight percent between 50 and 100-mesh with 5 percent coarser than 50-mesh and 15 percent finer than 100-mesh) and agglomerated with sodium silicate (about 3 percent). Prior to extrusion, the billet was heated in an electric furnace to 910° C. (1670° F.). The die and dummy block were made of a hot-work tool steel, hardened to 45–50 Rockwell C scale, and were not preheated.

Conditions for the extrusion were as follows:
Billet diameter: 60 mm. (2.36 inches)
Extrusion ratio: 24.5:1
Extrusion temperature: 910° C. (1670° F.)
Container temperature: 400° C. (752° F.)
Ram speed: 125 mm./sec. (300 i.p.m.) nominal.

Efficiency of the lubricant was measured by measuring surface finish of the extruded bars. Sixteen profilometer readings transverse to the extrusion direction were made at the front of the extruded bar and sixteen such readings were made at the back. The surface finish obtained varied from 120–200 microinches, R.M.S.

Example 13

Same conditions and materials as Example 12, except for the composition of the lubricant pad. For this extrusion, the lubricant pad consisted of a mixture of 95 percent (by volume) of glass No. 2 of Table I (sized 100 percent finer than 200-mesh) and 5 percent (by volume) of graphite (sized 100 percent finer than 325-mesh), the agglomeration being with sodium silicate as a binder. The surface finish obtained varied from 70–180 microinches, R.M.S.

Example 14

Same conditions and materials as Example 12, except that glass No. 4 of Table I was used in place of glass No. 2. The surface finish obtained varied from 100–200 micro-inches, R.M.S.

Example 15

Same conditions and materials as Example 14, except for the composition of the lubricant pad. For this extrusion, the lubricant pad consisted of a mixture of 60 percent (by volume) of glass No. 4 of Table I (sized 100 percent finer than 200-mesh) and 40 percent (by volume) of molybdenum disulfide (sized 98 percent smaller than 200-mesh and 70 percent smaller than 325-mesh), the agglomeration being with sodium silicate as a binder. The surface finish obtained varied from 65–170 microinches, R.M.S.

What is claimed is:

1. A preformed rigid disc for hot extrusion of metals, consisting essentially of a mixture of glass powder and a member of the group consisting of graphite, molybdenum disulfide and boron nitride held together by a small amount of binder, the graphite constituting, by volume, from 1 to 90% of the mixture, the molybdenum disulfide constituing, by volume, from 5 to 40% of the mixture, and the boron nitride constituting, by volume, from 10 to 40% of the mixture.

2. A preformed rigid disc for hot extrusion of metals, consisting essentially of a mixture containing, by volume, from 10 to 99% glass powder and from 1 to 90% graphite held together by a small amount of binder.

3. A preformed rigid disc for hot extrusion of metals, consisting essentially of a mixture containing, by volume, from 60 to 95% glass powder and from 5 to 40% molybdenum disulfide held together by a small amount of binder.

4. A preformed rigid disc for hot extrusion of metals, consisting essentially of a mixture containing, by volume, from 60 to 90% glass powder and 10 to 40% boron nitride, held together by a small amount of binder.

5. In a method of hot extruding a metal billet at high temperature from an extrusion chamber having a die at one end, the die having a die opening through which the billet is extruded, the steps comprising placing in the extrusion chamber against the die, a disc consisting essentially of agglomerated glass powder and from 1 to 90%, by volume, of particulate solid lubricant of the group consisting of graphite, molybdenum disulfide and boron nitride, placing in the extrusion chamber a metal billet heated to extrusion temperature, and extruding the billet at a temperature which causes the glass powder to melt and form a lubricating film of melted glass having particulate solid lubricant dispersed therein.

6. A method according to claim 5, wherein the billet is heated to an extrusion temperature of at least about 900° C.

7. A method according to claim 5, wherein the billet is heated to an extrusion temperature of about 900 to 1200° C.

8. In a method of hot extruding a metal billet at high temperature from an extrusion chamber having a die at one end, the die having a die opening through which the billet is extruded, the steps comprising placing in the extrusion chamber against the die, an agglomerated disc consisting essentially of, by volume, from 10 to 99% glass powder and from 1 to 90% particulate graphite, placing in the extrusion chamber a metal billet heated to extrusion temperature, and extruding the billet at a temperature which causes the glass powder to melt and form a lubricating film of melted glass having particulate graphite dispersed therein.

9. In a method of hot extruding a metal billet at high temperature from an extrusion chamber having a die at one end, the die having a die opening through which the billet is extruded, the steps comprising placing in the extrusion chamber against the die, an agglomerated disc consisting essentially of, by volume, from 60 to 95% glass powder and from 5 to 40% particulate molybdenum disulfide, placing in the extrusion chamber a metal billet heated to extrusion temperature, and extruding the billet at a temperature which causes the glass powder to melt and form a lubricating film of melted glass having particulate molybdenum disulfide dispersed therein.

10. In a method of hot extruding a metal billet at high temperature from an extrusion chamber having a die at one end, the die having a die opening through which the billet is extruded, the steps comprising placing in the extrusion chamber against the die, an agglomerated disc consisting essentially of, by volume, from 60 to 90% glass powder, and from 10 to 40% particulate boron nitride, placing in the extrusion chamber a metal billet heated to extrusion temperature, and extruding the billet at a temperature which causes the glass powder to melt and form a lubricating film of melted glass having particulate boron nitride dispersed therein.

References Cited in the file of this patent

UNITED STATES PATENTS

| | | |
|---|---|---|
| 1,714,564 | Koehler | May 28, 1929 |
| 2,156,803 | Cooper et al. | May 2, 1939 |
| 2,246,086 | Austin | June 17, 1941 |
| 2,361,211 | Kalischer | Oct. 24, 1944 |
| 2,400,099 | Brubaker et al. | May 14, 1946 |
| 2,427,636 | Vaughn et al. | Sept. 16, 1947 |
| 2,538,917 | Sejournet et al. | Jan. 23, 1951 |
| 2,757,138 | Clatet et al. | July 31, 1956 |
| 2,810,478 | Sejournet et al. | Oct. 22, 1957 |
| 2,832,468 | Krause | Apr. 29, 1958 |
| 2,842,837 | Huet et al. | July 15, 1958 |
| 2,926,138 | Huet | Feb. 23, 1960 |
| 2,946,437 | Edgecombe | July 26, 1960 |

FOREIGN PATENTS

| | | |
|---|---|---|
| 699,120 | Great Britain | Oct. 28, 1953 |
| 768,991 | Great Britain | Feb. 27, 1957 |
| 1,060,464 | France | Nov. 18, 1953 |
| 1,148,824 | France | July 1, 1957 |

OTHER REFERENCES

"The Extrusion of Titanium," by A. M. Sabroff, W. M. Parris, and P. D. Frost, WADC Technical Report 54–555, March 1955, p. 3.

"Cold Extrusion of Titanium," by A. M. Sabroff, R. A. Sannicandro, and P. D. Frost, pub. in "Tool Engineer," vol. 41, No. 1, July 1958, ASTE, Milwaukee, Wis., pp. 85–87.

"Metalworking Lubricants," by E. L. H. Bastian, McGraw-Hill Book Co., Inc., © 1951, pp. 101–103.